US008867876B2

(12) United States Patent
Saravanos et al.

(10) Patent No.: US 8,867,876 B2
(45) Date of Patent: Oct. 21, 2014

(54) OPTICAL FIBER SPLITTER MODULE AND FIBER OPTIC ARRAY THEREFOR

(75) Inventors: Costas Saravanos, Highland Village, TX (US); Elli Makrides-Saravanos, Highland Village, TX (US); Otto I. Szentesi, Hickory, NC (US); William J. Miller, Horseheads, NY (US)

(73) Assignee: Corning Cable Sytems LLC, Hickory, NC (US)

( * ) Notice: Subject to any disclaimer, the term of this patent is extended or adjusted under 35 U.S.C. 154(b) by 713 days.

(21) Appl. No.: 12/616,984

(22) Filed: Nov. 12, 2009

(65) Prior Publication Data
US 2010/0054664 A1 Mar. 4, 2010

Related U.S. Application Data (60) Division of application No. 11/333,039, filed on Jan. 17, 2006, now Pat. No. 7,756,382, which is a continuation-in-part of application No. 11/171,915, filed on Jun. 30, 2005, now abandoned.

(51) Int. Cl.
  *G02B 6/42* (2006.01)
  *G02B 6/00* (2006.01)
  *G02B 6/36* (2006.01)
  *G02B 6/28* (2006.01)

(52) U.S. Cl.
  CPC .............. *G02B 6/368* (2013.01); *G02B 6/2804* (2013.01); *G02B 6/3636* (2013.01); *G02B 6/3664* (2013.01)
  USPC ................................ 385/52; 385/53; 385/137

(58) Field of Classification Search
  USPC ...................... 385/52, 53, 106, 112, 114, 137
  See application file for complete search history.

(56) References Cited

U.S. PATENT DOCUMENTS

| 3,430,057 | A | * | 2/1969 | Genahr ..................... 250/227.28 |
| 4,252,407 | A | | 2/1981 | Bubanko et al. ................. 385/59 |
| 5,930,438 | A | | 7/1999 | Palmskog et al. .............. 385/129 |
| 6,045,269 | A | | 4/2000 | Watanabe et al. ................ 385/59 |
| 6,231,244 | B1 | | 5/2001 | Fukuyama et al. .............. 385/76 |
| 6,299,361 | B1 | * | 10/2001 | Sasaki et al. ..................... 385/59 |
| 6,498,882 | B1 | * | 12/2002 | Buckelew et al. .............. 385/114 |
| 6,556,754 | B2 | * | 4/2003 | Simmons et al. .............. 385/121 |
| 6,865,332 | B1 | | 3/2005 | Saravanos et al. ............. 385/136 |
| 6,873,772 | B2 | * | 3/2005 | Nakaya ......................... 385/114 |
| 2003/0044141 | A1 | | 3/2003 | Melton et al. ................. 385/114 |

(Continued)

FOREIGN PATENT DOCUMENTS

| EP | 0583986 A2 | 2/1994 | .............. G02B 6/42 |
| EP | 0636909 A1 | 2/1995 | .............. G02B 6/30 |
| EP | 0738908 A2 | 10/1996 | .............. G02B 6/30 |

OTHER PUBLICATIONS

European Patent Office, Search Report, Feb. 27, 2013, 7 pages.

*Primary Examiner* — Kevin S Wood
(74) *Attorney, Agent, or Firm* — C. Keith Montgomery (57) ABSTRACT

An optical fiber splitter has a higher density fiber optic array that allows for smaller packaging. The optical fibers that extend from the optical fiber splitter have one end connectorized and their spacing at the other end reduced, thereby eliminating components that were heretofore required. A method of making the fiber optic array includes interleaving the optical fibers to reduce the overall dimensions of the fiber optic array and the fiber optic splitter. A tool is used to reduce the spacing of the optical fibers in the fiber optic array.

5 Claims, 8 Drawing Sheets

(56) References Cited

U.S. PATENT DOCUMENTS

| | | | |
|---|---|---|---|
| 2003/0091289 A1 | 5/2003 | Saito et al. | 385/49 |
| 2003/0142946 A1 | 7/2003 | Saito et al. | 385/137 |
| 2004/0136710 A1 | 7/2004 | Valette | 398/57 |
| 2005/0046928 A1 | 3/2005 | Bischel et al. | 359/341.3 |
| 2005/0141831 A1* | 6/2005 | Bocanegra et al. | 385/100 |
| 2005/0254770 A1 | 11/2005 | Watanabe | 385/137 |

* cited by examiner

OPTICAL FIBER SPLITTER MODULE AND FIBER OPTIC ARRAY THEREFOR

RELATED APPLICATIONS

This application is a Divisional of U.S. Ser. No. 11/333,039, filed on Jan. 17, 2006 now U.S. Pat. No. 7,756,382, which is a Continuation-In-Part of U.S. Ser. No. 11/171,915, filed on Jun. 30, 2005 now abandoned, the disclosures of which are incorporated herein by reference in their entireties.

BACKGROUND

1. Technical Field

The present invention relates generally to an optical fiber splitter module with a higher density fiber optic array that allows for smaller packaging of the fiber optic array and splitter. The optical fibers that extend from the optical fiber splitter module have one end connectorized and the spacing at the second end reduced, thereby eliminating components that were heretofore required and made the splitter modules large and cumbersome.

2. Technical Background

Communications networks, and particularly high bandwidth optical networks, are being installed closer to the subscribers' homes. However, installing the optical fibers closer to the subscribers' homes can be cost prohibitive. Therefore, the network owners are conscious of the expenses related to installing the optical fibers and the associated equipment further away from the central office and closer to the subscribers. Currently, one expensive component of the network that is limiting the installation of the optical fibers closer to the home is the optical splitter. An optical splitter divides the optical signals into individual signals for the subscribers. Typically, as more subscribers are added to a network, new optical splitters are required in a space that is already relatively crowded. Therefore, a new optical splitter module that allows for higher densities of optical fibers in a similar space requirement is needed. A new method for arranging the optical fibers and a tool are also needed to assemble the fiber array of the high density splitter module.

SUMMARY

To achieve these and other advantages and in accordance with the purpose of the invention as embodied and broadly described herein, the invention is directed in one aspect to a splitter module that includes a housing having a first end, a second end, and an opening extending therebetween, a splitter chip disposed within the housing, a plurality of optical fibers having a first end and a second end, the first end of the plurality of optical fibers being attached to a first edge of the splitter chip, the second end of each of the plurality of optical fibers having a coating thereupon with an outer diameter between about five and about twenty times larger than a diameter of each of the plurality of optical fibers at the first end, and at least one optical fiber attached to a second edge of the splitter chip and being in optical communication with each of the plurality of optical fibers extending from the first edge of the splitter chip.

In another aspect, the invention is directed to a fiber array that includes a base member having a first edge, a second edge, and a central portion, and a plurality of optical fibers extending from the first edge to the second edge, the plurality of optical fibers being parallel to one another in a first portion adjacent the first edge and in a second portion adjacent the second edge, and the plurality of optical fibers being nonparallel to one another in the central portion of the base member.

In yet another aspect, the invention is directed to fiber array that includes a base member having a first edge, a second edge, and a central portion, and a plurality of optical fibers extending from the first edge across the central portion and beyond the second edge, each of the plurality of optical fibers having a first end adjacent the first edge and being connectorized at a second end, the second end of the optical fibers extending beyond the second edge of the base member.

In another aspect, the invention is directed to a method of assembling an interleaved fiber array, the fiber array having at least two pluralities of optical fibers, the optical fibers having a diameter and including the steps of providing a first plurality of optical fibers, each of the first plurality of optical fibers having a first end and a second end and each of the optical fibers having a coating at the first end such that the diameter of the optical fibers at the first end is at least 3.5 times the diameter of the optical fibers at the second end, and the optical fibers generally being aligned in a first plane at the first end; providing a second plurality of optical fibers, each of the second plurality of optical fibers having a first end and a second end and each of the optical fibers having a coating at the first end such that the diameter of the optical fibers at the first end is at least 3.5 times the diameter of the optical fibers at the second end, and the optical fibers generally being aligned in a second plane at the first end; aligning the first and second plurality of optical fibers relative to one another at the first ends such that each of the optical fibers in the first and second plurality of optical fibers is aligned in a plane orthogonal to the first and second planes, and each of the orthogonal planes for each of the optical fibers in the first and second pluralities of optical fibers are different from one another; and interleaving the second ends of the optical fibers of the first and second pluralities of optical fibers into a third plane wherein an optical fiber from one plurality of optical fibers is not adjacent to another optical fiber from the same plurality of optical fibers.

In yet another aspect, the invention is directed to a tool for adjusting horizontal and vertical spacing between optical fibers that includes an upper surface defining a length and a depth, and at least two side surfaces extending into the upper surface to create a cavity therein, the side surfaces generally extending toward one another along at least a portion of the length of the upper surface thereby defining a generally V-shaped configuration, the cavity having a depth of at least 130 microns.

In yet another aspect, the invention is directed to a tool for adjusting spacing between optical fibers that includes a base member having a front face and a rear face, and an opening in the base member extending between the front face and the rear face, the opening defining a depth and a width, the width of the opening decreasing between the front face and the rear face as the depth decreases.

Additional features and advantages of the invention are set out in the detailed description which follows, and in part and are readily apparent to those skilled in the art from that description or recognized by practicing the invention as described herein, including the detailed description which follows, the claims, as well as the appended drawings.

It is to be understood that both the foregoing general description and the following detailed description present exemplary and explanatory embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various exemplary embodiments of the invention, and together with the description, serve to explain the principles and operations of the invention.

DETAILED DESCRIPTION OF EXEMPLARY EMBODIMENTS

Figure 1:
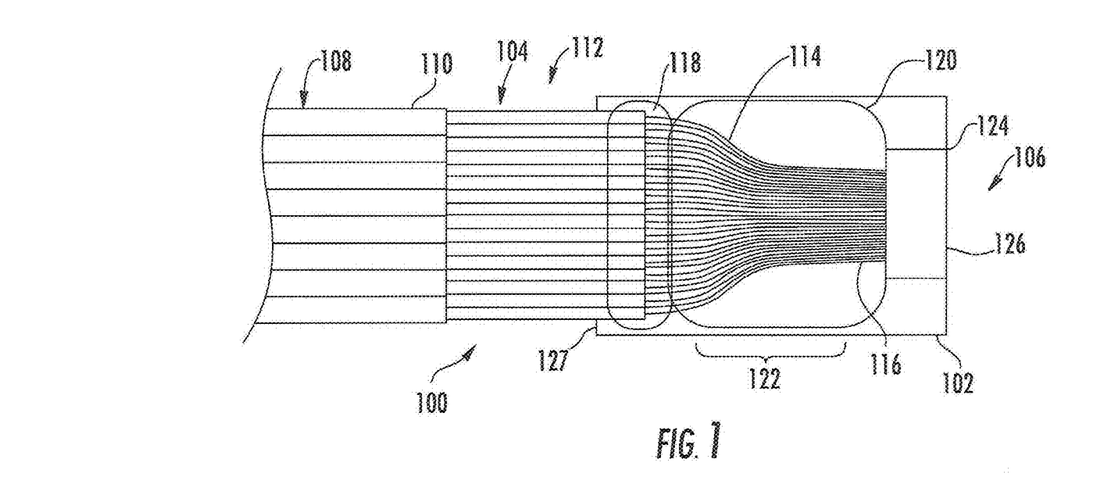
FIG. 1 is a top view of an optical fiber array according to one embodiment of the present invention.
Figure 2:
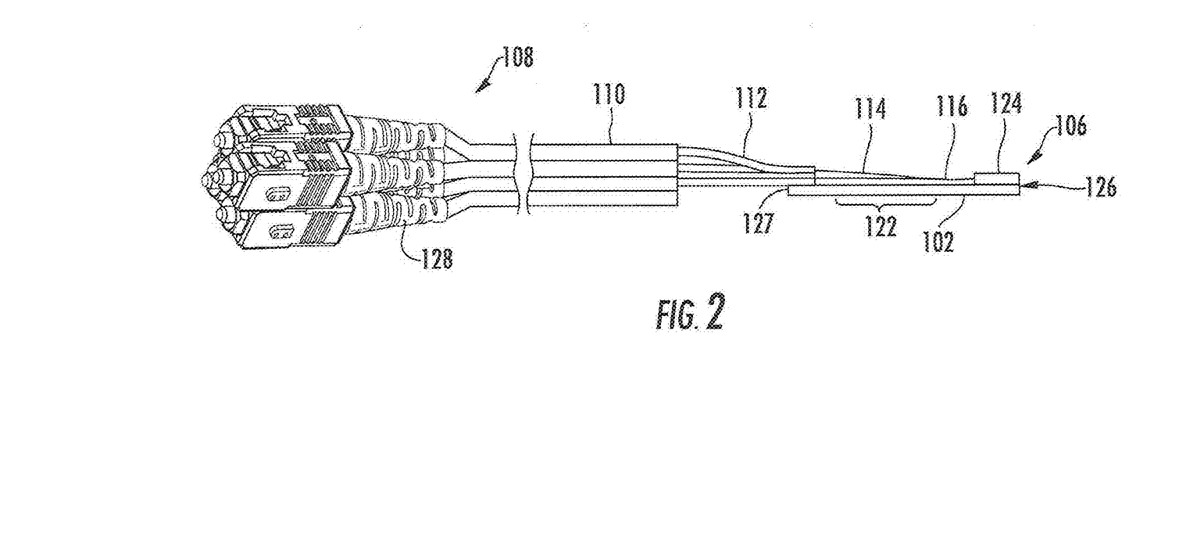
FIG. 2 is a side view of the optical fiber array in FIG. 1.

Reference will now be made in detail to exemplary embodiments of the invention, examples of which are described herein and shown in the accompanying drawings. Whenever practical, the same reference numerals are used throughout the drawings to refer to the same or similar parts or features. One embodiment of an optical fiber array according to the present invention is illustrated in FIGS. 1 and 2 and is designated generally throughout the following detailed description by the reference numeral 100.

The optical fiber array 100 has a base member 102 to which the optical fibers 104 are attached. The base member 102 is preferably made of glass, but any material suitable for the purpose may be used. The optical fibers 104 have a first end 106 and a second end 108. The second end 108 of the optical fibers 104 have the largest diameter, and in FIGS. 1 and 2, are buffered optical fibers having an outer diameter of 2 mm. As defined herein, the terms "optical fiber" and "optical fibers" include optical waveguides that may or may not have a coating (matrix or otherwise) or a jacket or other coverings or elements that increase the overall diameter thereof. For example, optical fibers would include those optical fibers that are only 125 micron in diameter (i.e., bare optical fibers), as well as those that have been up-jacketed to 900 microns, 2 mm, or greater.

At first end 106, the optical fibers 104 are attached directly to the plate 102 and are preferably bare optical fibers having a diameter of about 125-127 microns. However, in the depicted embodiment, the optical fibers 104 are originally presented as 2 mm buffered fibers 110 at the second end, which are preferably then stripped to 900 micron fibers at portion 112, and then to 250 micron fibers at portion 114, before being stripped to bare optical fibers 116 at first end 106. As illustrated, the 900 micron fibers at portion 112 are preferably attached to the base plate 102 of the fiber array 100 with an epoxy adhesive 118, but any adhesive suitable for the purpose may be used. The 250 micron fibers at portion 114 are also attached to the base plate as well with an epoxy adhesive 120, thereby preventing as much stress on the bare optical fibers 116 as possible, particularly at the leading edge 126.

The optical fibers 104 could also be attached at portion 110 (with a corresponding larger base 102) or only at portion 114. As will be explained later, the optical fibers 104 at portion 114 (which are 250 microns in diameter) are spaced at a distance of about 900 microns and are generally parallel to one another as they step down in size from the 900 micron diameter size to the 250 micron diameter size. In the portion 114, the spacing between the optical fibers 104 is reduced, causing the optical fibers to no longer be parallel to one another through a central portion 122 of the base member 102. The bare optical fibers 116, having been stripped of coatings or matrix at first end 106, are placed in close proximity to one another before being aligned and secured under a v-groove plate 124, which is also preferably made of glass, but may also be made of silicone. It is also possible that the v-grooves are part of the base member 102, in which case the plate 124 can either be a flat glass plate or a v-groove plate. The optical fibers 116 must be parallel to one another at the first end 106 since the first edge 126 of the base member 102 mates with a splitter chip (not shown in FIGS. 1 and 2).

The first edge 126 of the fiber array 100 is then polished, preferably at an 8° angle to allow for an angled physical contact (APC) optical connection with an optical chip, whose edges are also polished at a complementary angle. The optical fibers 116 are preferably bonded to the base plate near the leading edge 126 with an adhesive. The optical fibers 104 may be in any format, including an optical fiber ribbon, single loose optical fibers, or, as illustrated in FIGS. 1 and 2, buffered optical fibers.

The optical fibers 104 extend beyond the second edge 127 of the base member 102 where the second end 108 of the optical fibers 104 are preferably connectorized with an appropriate fiber optic connector 128. While an SC connector is illustrated, any other type or configuration of fiber optic connector is within the scope of the present invention and should be matched to the type and configuration of the optical fibers 104 at the second end 108.

Figure 3:
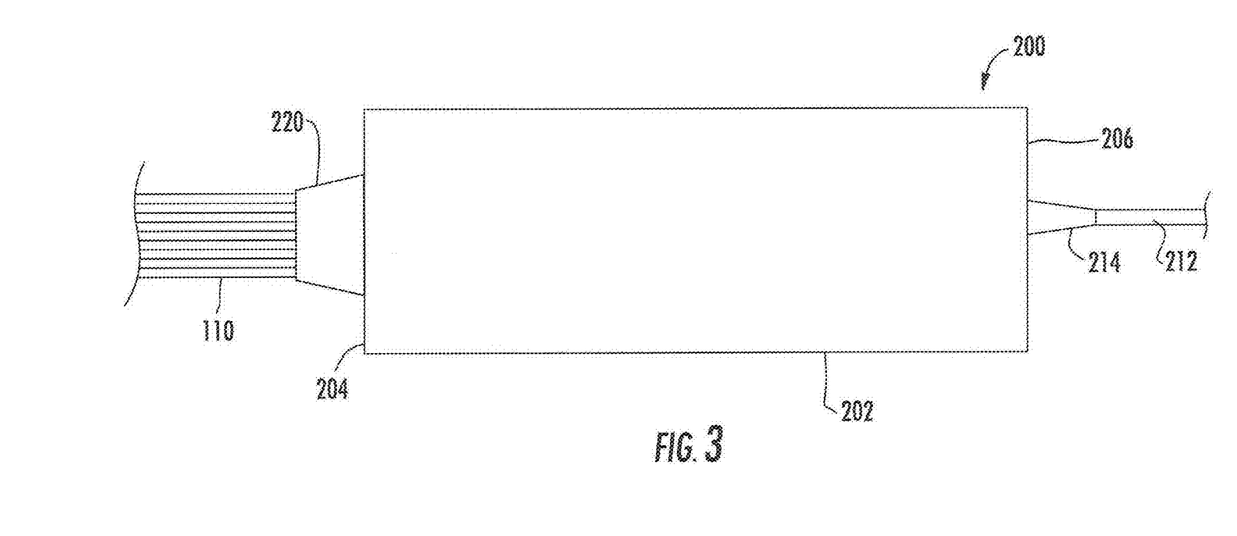
FIG. 3 is a top view of one embodiment of a fiber optic splitter module according to the present invention.
Figure 4:
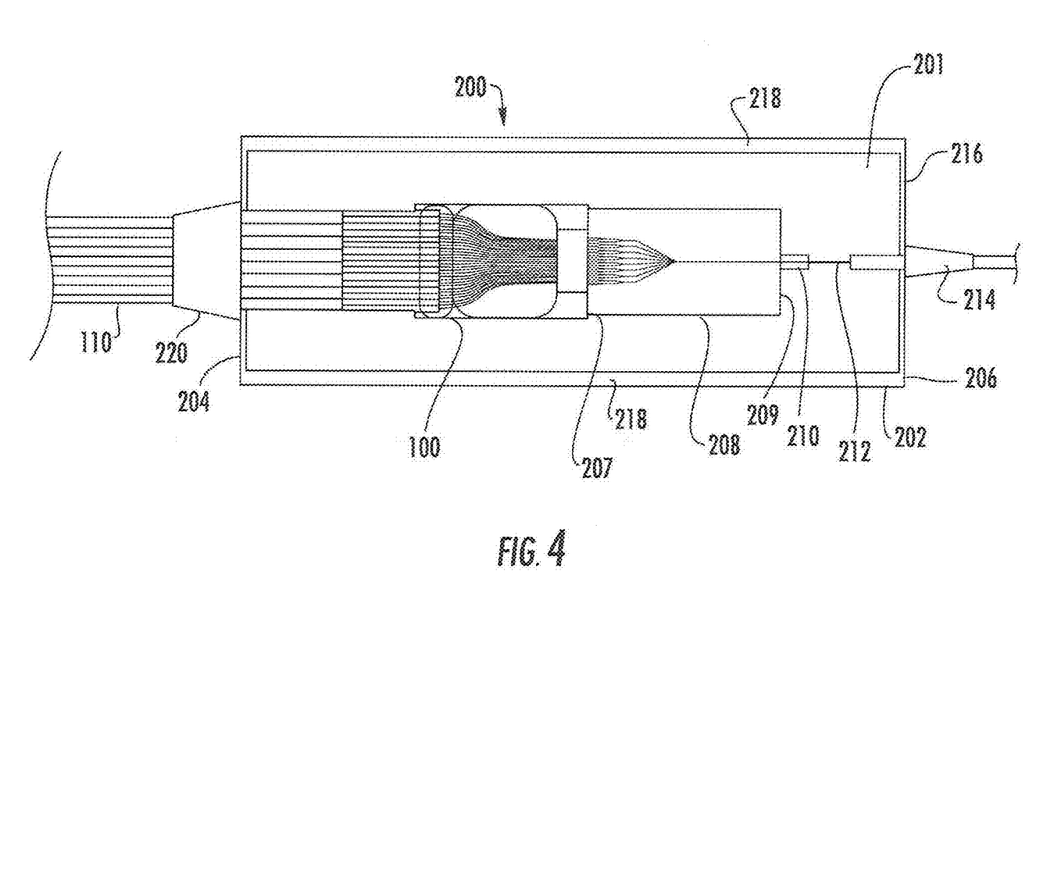
FIG. 4 is a lengthwise cross sectional view of the fiber optic splitter module in FIG. 3.

The fiber optic array 100 is preferably used with a splitter module 200 of the type illustrated in FIGS. 3 and 4. As best illustrated in FIG. 4, the fiber optic array 100 is located within an opening 201 of the housing 202 of the splitter module 200 between a first end 204 and a second end 206 of the housing. The fiber optic array 100 is attached along first edge 126 to a first edge 207 of an optical splitter chip 208. The optical splitter chip 208 is also attached at a second edge 209 to an optical ferrule 210, which allows for optical communication with an input optical fiber 212 entering the splitter module 200 at the second end 206. The optical fiber 212 may be of any configuration suitable for the purpose and may include a strain relief boot 214.

The splitter module 200 is preferably filled with a potting compound 216, for example silicone, to hold the internal components in place and to protect them from contacting the sides 218 of the housing 202 and from shock and vibration. The splitter module 200 is illustrated to be in a generally rectangular configuration, but any suitable configuration may be used, i.e., cube, cylinder, etc.

Figure 5:
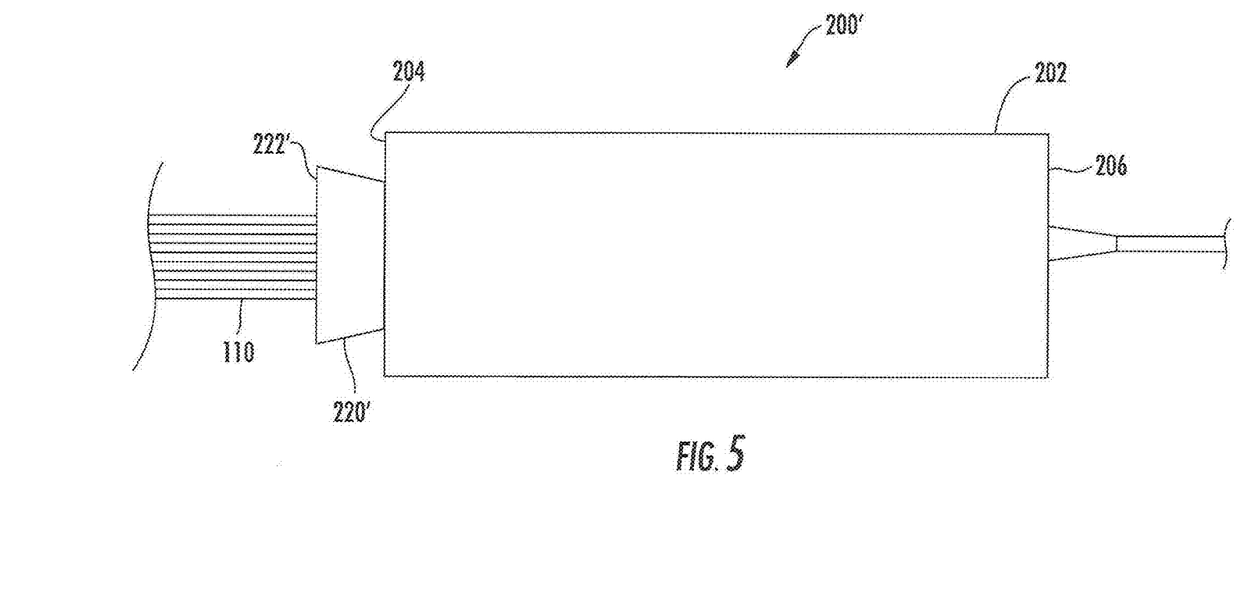
FIG. 5 is a top view of another embodiment of a fiber optic splitter module according to the present invention shown with the top portion removed for purposes of clarity.

The optical fibers 110 entering the first end 204 may also be strain relieved by a strain relief member 220. As is usual in the art, the strain relief 220 is wider at the first end 204 of housing 202 and becomes narrower as it extends down the optical fibers 110 and away from housing 202. However, as is illustrated with reference to the splitter module 200' in FIG. 5, the strain relief member 220' is reversed with the widest point 222' positioned away from the housing 202. This configuration likewise provides strain relief to the optical fibers 110, but also allows for more variation in the angle that the optical fibers 110 enter the housing 202.

Figure 6:
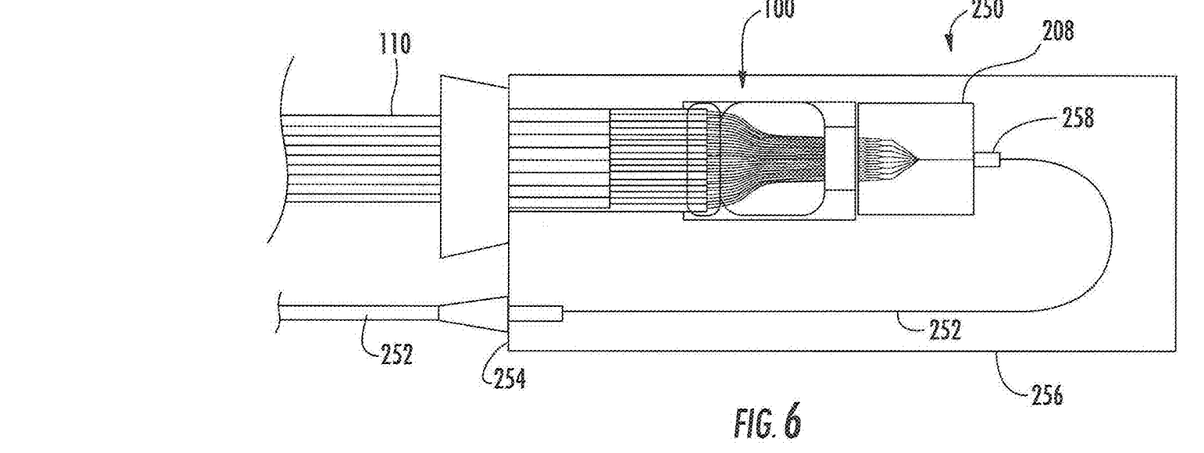
FIG. 6 is a top view of another embodiment of a fiber optic splitter module according to the present invention.

Another embodiment of a splitter module 250 is illustrated in FIG. 6. In this embodiment, the internal components of the splitter module may be the same as the two previous embodiments, but the optical fiber 252 entering the splitter module 250 and connecting to the optical splitter chip 208 through the optical ferrule 258 is longer in length than optical fiber 212 of the previous embodiment. In this embodiment, the optical fibers enter and leave the splitter module 250 from the same end 254 of the housing 256. The optical fiber 252 enters the housing, and once past the optical splitter chip 208, curves back around to the optical ferrule 258 at a radius larger than the minimum bend radius of the optical fiber 252. This configuration allows for the splitter module 250 to be used in even tighter spaces and/or where no access is allowed or possible to both ends of the splitter module.

Figure 7:
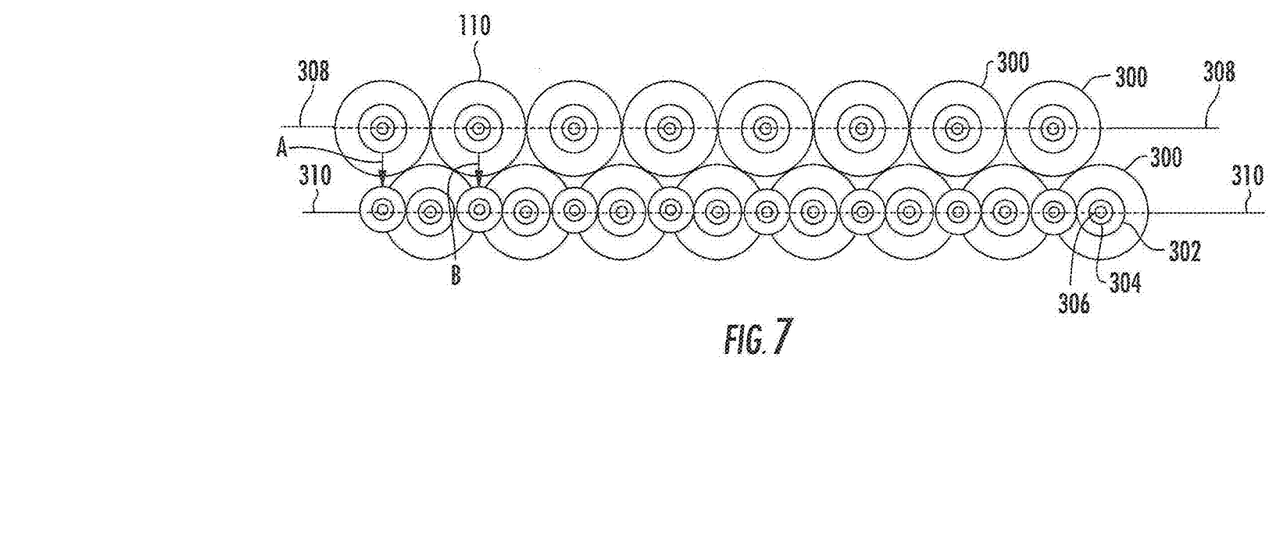
FIG. 7 is an end view of two pluralities of optical fibers partially interleaved according to one embodiment of the present invention.

A method of interleaving the optical fibers 104 that may be used in conjunction with the optical fiber array 100 or with any other suitable fiber array or splitter module will now be described in reference to FIGS. 7-8. As noted above with reference to FIGS. 1 and 2, the optical fibers 104 are preferably stacked in a generally rectangular configuration with the optical fibers 110 forming four rows of eight fibers for a total of 32 optical fibers. It should be noted that other multi-row configurations are possible and within the scope of the present invention. While the optical fibers 104 may be in a perfect rectangular configuration, it is preferable that the optical fibers are arranged as illustrated in an end view in FIG. 7. The optical fibers 110 are illustrated to be 2 mm buffered optical fibers 300, with a 900 micron jacket 302, a 250 micron diameter outer jacket 304 and the 125 micron bare optical fiber 306. The optical fibers 104 may be loose or attached to one another in rows (e.g., ribbonized) to make the handling of the optical fibers easier and with less damage to the optical fibers. As illustrated in FIG. 7, the optical fibers 110 are arranged in two sets of eight optical fibers (only two sets are shown for purposes of clarity), with each set of eight optical fibers arranged in a different plane 308,310, which are generally parallel to one another. The sets of optical fibers 110 are preferably offset from one another for reasons that will be described in reference to FIG. 8, which illustrates all four sets of optical fibers.

As described above, the bare optical fibers 116 are to be to secured to the base member 102 of the optical fiber array 100 in a single plane. However, in order to keep the fiber array 100 to its smallest overall width (including the optical fibers 110 at the second end 108), the larger diameter ends of the optical fibers 110 are preferably stacked in multiple horizontal planes to keep the overall width to a minimum. When the optical fibers 110 are stacked, they must then be interleaved to orient the bare optical fibers 116 into the single plane. While only two of the sets of optical fibers are illustrated in FIG. 7 for purposes of clarity, the same principles also apply to a larger number of sets of optical fibers 110. However, the optical fibers 110 preferably begin at the second end 108 as 2 mm buffered optical fibers. As shown herein, the optical fibers 104 are arranged in a generally rectangular configuration, with the 2 mm optical fiber portions 110 arranged into sets of eight fibers. The 900 micron optical fiber portion 112 are interleaved and then the 250 micron optical fiber portions 114 are interleaved to produce the 125 micron optical fiber portions 116 in a single horizontal plane, as will be described.

The outer covering 300 of the optical fiber is removed, thereby reducing the outer diameter of the optical fibers to 900 mm (see also portions 110 and 112 in FIGS. 1 and 2). With the optical fibers 110 offset in the horizontal direction from one another, they can be combined into a different plane (FIG. 8 illustrates the optical fibers 110 of plane 308 being moved to plane 310 by arrows A,B). Rather than one set or plurality of optical fibers 110 being moved from one plane (e.g., 308) into the plane (e.g., 310) of another set or plurality of optical fibers 110, the optical fibers from both pluralities of optical fibers could be combined in a third plane that is not common with either of the planes 308,310. This process continues until all of the optical fibers 110 from all of the sets of optical fibers are in a common plane and have the desired outer diameter.

Figure 8:
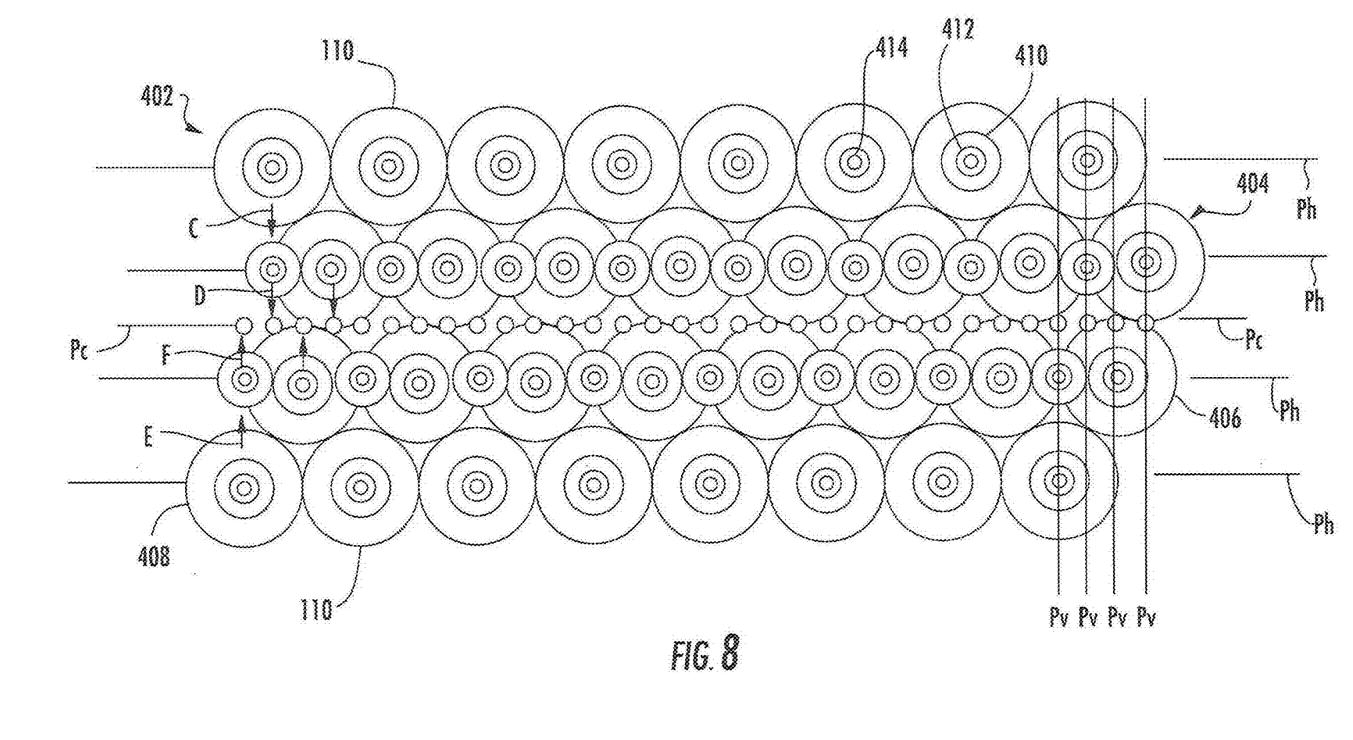
FIG. 8 is an end view of four pluralities of optical fibers interleaved according to another embodiment of the present invention.

Four pluralities 402,404,406,408 of optical fibers 110 are illustrated in FIG. 8 from an end view. The optical fibers 110 in each of the four pluralities 402,404,406,408 lie in a different horizontal plane $P_H$. Each of the optical fibers 110 in each of the four pluralities 402,404,406,408 also lie in a different vertical plane $P_V$ so that when the optical fibers are moved into a single horizontal plane, as will be described in more detail below, the optical fibers will not have to be moved horizontally (along plane $P_H$) as they are moved vertically (along plane $P_V$).

The optical fibers 110 are, as in the previous figures, illustrated as starting at one end as 2 mm buffered optical fibers, although the present method can be used with any configuration and number of optical fibers. The optical fibers 110 can then be stripped down to 900 micron fibers 410 and even down to the 250 micron outer jacket 412 before the bare 125 micron optical fiber 414 is reached.

The optical fibers from the first plurality 402 are illustrated as being moved vertically (in the plane of the figure) downward to the horizontal plane of the second plurality 404 in the 900 micron format (see arrow C). The optical fibers from the first and second pluralities 402,404 of optical fibers are then moved vertically downward into a central plane $P_C$ (see arrow D). Similarly, the optical fibers from the fourth plurality 408 are moved vertically upward into the plane of the third plurality 406 of optical fibers (see arrow E) before the optical fibers from the third and the fourth pluralities 406,408 are moved vertically upward into the central plane $P_C$ (see arrow F). The optical fibers 104 are illustrated as being in their 125 micron diameter size when they are being moved into the central plane $P_C$. It should be understood that the optical fibers illustrated as being a different diameter corresponds to the diameters of the optical fibers at different positions along the optical fibers as one moves toward the viewer, for example, the different diameters are illustrated as they would be seen if looking from the first end 106 toward the second end 108 in FIG. 1.

The optical cores of the bare optical fibers 116 are approximately 250 microns apart in the central plane $P_C$ (or in any other horizontal plane into which the optical fibers 104 are interleaved), even though the optical fibers are only 125 microns in diameter. The spacing of the optical fibers 116 then needs to be reduced so that the spacing between the optical fibers is as close as possible for aligning with the v-groove plate 124 or any other appropriate structure at the end of the fiber array. One embodiment of a tool that may be used to reduce the vertical and/or horizontal spacing between the optical fibers 104 is illustrated in FIG. 9.

Figure 9:
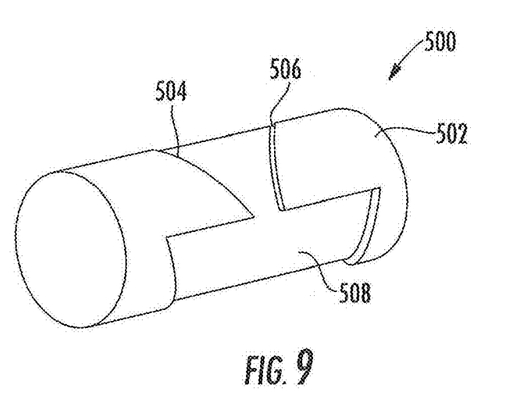
FIG. 9 is a perspective view of one embodiment of a tool according to the present invention.
Figure 10:
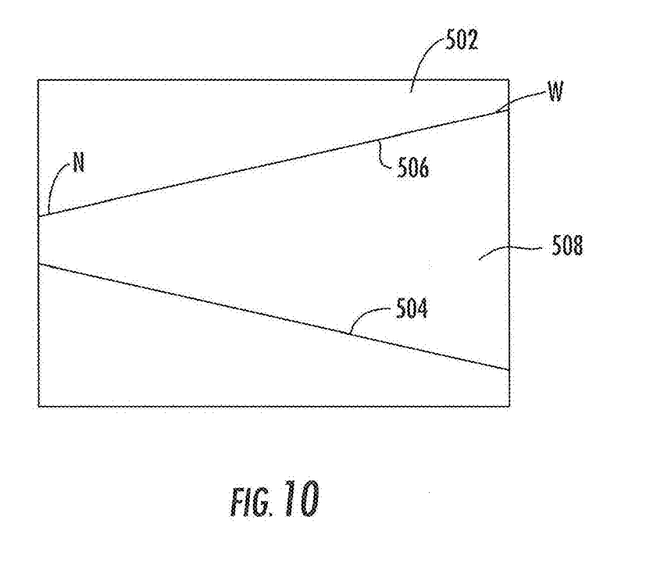
FIG. 10 is a top view of the tool in FIG. 9 shown in a planar representation for purposes of explanation.

The tool 500 in FIG. 9 is preferably a cylindrical tool (a handle, which is not shown, may be attached to the cylindrical tool 500 to assist in its use). The cylindrical tool 500 has a surface 502 to engage a flat surface on which the optical fibers 104 are placed. The cylindrical tool 500 has a diameter that is appropriate for the length of fibers that are to have their spacing reduced. The cylindrical tool 500 has two sides 504, 506 that extend into the surface 502 of the cylindrical tool 500 to create a cavity 508 that is preferably about 130 microns deep. The cavity 508 is represented in FIG. 10 as if the surface 502 of the cylindrical tool was a planar surface having a widest portion W that decreases in width to a narrowest portion N, thereby defining a generally V-shaped configuration. The widest portion W should be wide enough to accommodate the total width of the optical fibers 104 that are to be reduced in spacing, such as about 17 mm for the configuration of optical fibers shown in FIG. 8. As shown in FIG. 9, the narrowest portion N of cavity 508 is in physical communication with the widest portion W of cavity 508, although it need not be in communication. The narrowest portion N should similarly accommodate the total width of the optical fibers that are aligned in the central plane Pc, which in FIG. 8 is about 4 mm.

The sides 504,506 are illustrated as being generally smooth along their length. However, they may be curved, stepped, wavy, or of any configuration suitable for the purpose. The depth of the cavity 508 also preferably varies from a deeper cavity at the widest end W, where the diameter of the optical fibers is typically at least 250 microns and may be even larger, to a shallower cavity at the narrowest end N where the optical fibers are typically only 125 microns in diameter. Therefore, the cavity 508 preferably increases in depth from the narrowest end N, where it is at least 125 microns but less than 250 microns (a depth that prevents the optical fibers from crossing over one another in the cavity), to as much 900 microns at the widest end W to accommodate the larger diameter portion of the optical fibers.

Figure 11:
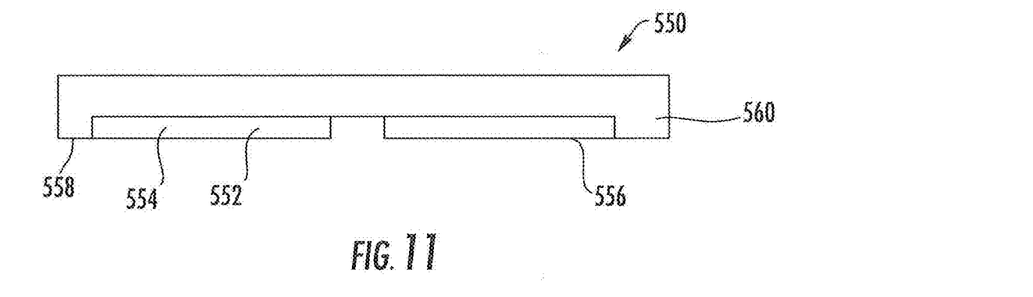
FIG. 11 is a front view of another embodiment of a tool according to the present invention.
Figure 12:
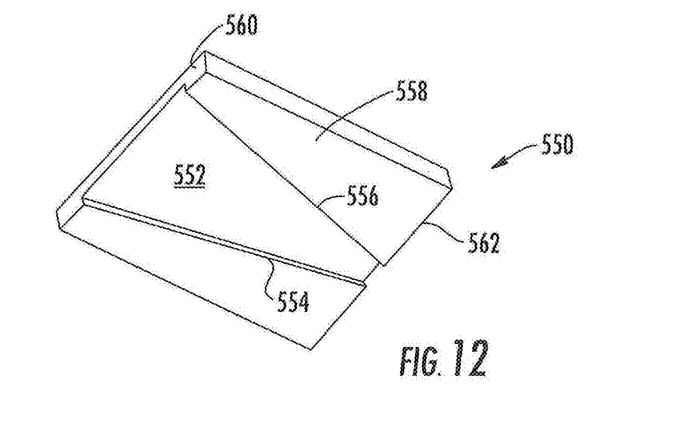
FIG. 12 is a perspective view as seen from the bottom of the tool in FIG. 11.

Another embodiment of a tool 550 to reduce the spacing of the optical fibers 104 is illustrated in FIGS. 11 and 12. The tool 550 is similar to cylindrical tool 500, but is designed to have the optical fibers inserted into a cavity 552 defined by two side surfaces 554,556 in upper surface 558. The cavity 552 extends between a front face 560 and a rear face 562, with the cavity 552 wider at the front face and narrowing toward the rear face 562, defining a generally V-shaped configuration. The depth of the cavity 552 is preferably at least 125 microns and more preferably at least 130 microns. As with the prior embodiment, the depth of the cavity 552 preferably varies from between about 125 microns and about 250 microns at the narrowest end N to as deep as 900 microns at the widest end W. The side surfaces 554,556 may also be other than straight surfaces as depicted. They may curved, wavy, stepped, or of any other configuration as long as they generally move toward one another along the length of the sides 554,556 of the tool 550.

The tool 550 may be used on a work surface, table top, or any other appropriate flat surface and the plurality of optical fibers 104 would be inserted into the cavity 552 through the front face 560 and the side surfaces 554,556 would force the optical fibers to move closer to one another without allowing them to cross over one another inside the cavity 552.

Figure 13:
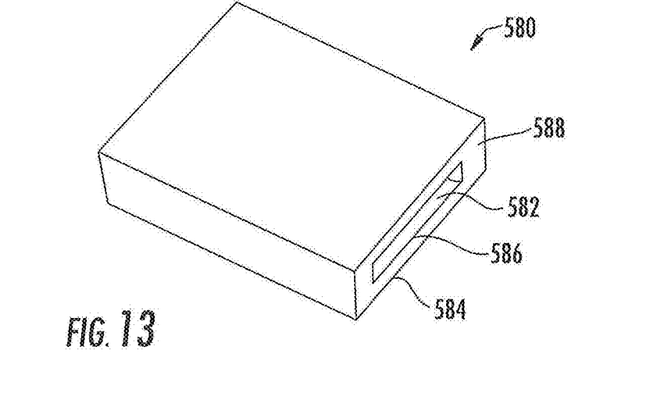
FIG. 13 is a perspective view of another embodiment of a tool according to the present invention.

Another embodiment of a tool 580 is illustrated in FIG. 13. The tool 580 is similar to tool 550, but it has a bottom portion 584 that encloses the cavity 582, and therefore, need not be used on a work surface, table top, or any surface at all. The optical fibers are simply inserted into the opening 586 in the front face 588, and then moved along the cavity 582, which is similar in construction to those described above with reference to tools 500,550.

It will be apparent to those skilled in the art that various modifications and variations can be made in the optical planar splitter of the present invention without departing from the spirit or scope of the invention. Thus, it is intended that the present invention cover the modifications and variations of this invention provided they come within the scope of the appended claims and their equivalents.

That which is claimed is:

1. A method of assembling an interleaved fiber array having at least two pluralities of optical fibers, the optical fibers having a diameter, the method comprising:
   providing a first plurality of optical fibers, each of the optical fibers having a first end and a second end and each of the optical fibers having a coating at the first end such that the diameter of the optical fibers at the first end is at least 3.5 times the diameter of the optical fibers at the second end, and the optical fibers generally being aligned in a first plane at the first end;
   providing a second plurality of optical fibers, each of the optical fibers having a first end and a second end and each of the optical fibers having a coating at the first end such that the diameter of the optical fibers at the first end is at least 3.5 times the diameter of the optical fibers at the second end, and such that the diameter of the optical fibers at at least one portion between the first end and the second end is less than the diameter of the optical fibers at the first end and is greater than the diameter of the optical fibers at the second end, and the optical fibers generally being aligned in a second plane at the first end;
   aligning the first and second plurality of optical fibers relative to one another at the first end of the optical fibers such that each of the optical fibers of the first and second plurality of optical fibers is aligned in a plane orthogonal to the first and second planes and each of the orthogonal planes for each the optical fibers in the first and second pluralities of optical fibers are different from one another; and
   interleaving the second ends of the optical fibers from the first and second pluralities of optical fibers into a third plane wherein an optical fiber from one plurality of optical fibers is not adjacent to another optical fiber from the same plurality of optical fibers, and wherein at least one of the optical fibers from the first plurality of optical fibers is adjacent to two optical fibers from the second plurality of optical fibers.

2. The method of claim 1, wherein the third plane is the same as the first plane.

3. The method of claim 1, wherein the first and second plurality of optical fibers are comprised of optical fibers that are interleaved optical fibers from a third and fourth plurality of optical fibers.

4. The method of claim 1, further comprising the step of reducing the spacing between each of the optical fibers at their second ends such that the spacing between each optical fiber is less than 10% of the diameter of optical fibers at the second end.

5. The method of claim 1, wherein the diameter of the optical fibers at the first end is at least 14 times the diameter of the optical fibers at the second end.

* * * * *